(12) United States Patent
Wu

(10) Patent No.: US 9,145,186 B2
(45) Date of Patent: Sep. 29, 2015

(54) QUICK-RELEASE DEVICE OF BICYCLE BRAKE CABLE

(71) Applicant: Da Hao Wu, Changhua (TW)

(72) Inventor: Da Hao Wu, Changhua (TW)

(73) Assignee: Tektro Technology Corporation, Changhua (TW)

(*) Notice: Subject to any disclaimer, the term of this patent is extended or adjusted under 35 U.S.C. 154(b) by 0 days.

(21) Appl. No.: 14/264,062

(22) Filed: Apr. 29, 2014

(65) Prior Publication Data

US 2014/0231187 A1 Aug. 21, 2014

(51) Int. Cl.
*B62L 1/14* (2006.01)

(52) U.S. Cl.
CPC ............... *B62L 1/14* (2013.01); *B62K 2206/00* (2013.01)

(58) Field of Classification Search
CPC ............... B62L 1/10; B62L 1/12; B62L 1/14; B62L 1/16; B62L 2206/00
See application file for complete search history.

(56) References Cited

U.S. PATENT DOCUMENTS

| 5,328,001 | A | * | 7/1994 | Yoshikawa | 188/24.22 |
| 6,279,688 | B1 | * | 8/2001 | Goldman et al. | 188/24.22 |
| 6,615,956 | B1 | * | 9/2003 | Chuang | 188/24.18 |
| 2001/0025542 | A1 | * | 10/2001 | Noetzold | 74/502.5 |
| 2010/0236874 | A1 | * | 9/2010 | Tsai | 188/24.22 |
| 2011/0127119 | A1 | * | 6/2011 | Tsai | 188/24.19 |
| 2012/0181120 | A1 | * | 7/2012 | Jordan | 188/24.21 |

FOREIGN PATENT DOCUMENTS

| DE | 29610399 U1 * | 8/1996 |
| EP | 2505476 A1 * | 10/2012 |

* cited by examiner

*Primary Examiner* — Anna Momper

(57) ABSTRACT

A quick-release device for a bicycle brake including a first brake arm, a second brake arm, and a brake cable terminated at the second brake arm, the quick-release device is provided with a lever including a long part and a short part pivotably secured to a top of the second brake arm; and an attachment assembly for securing the brake cable to a joining portion of the long part and the short part. A rotation of the lever in a first direction loosens the brake cable and increases a distance between the first brake arm and the second brake arm. A rotation of the lever in a second direction contrary to the first direction tightens the brake cable and decreases the distance between the first brake arm and the second brake arm.

1 Claim, 10 Drawing Sheets

QUICK-RELEASE DEVICE OF BICYCLE BRAKE CABLE

BACKGROUND OF THE INVENTION

1. Field of the Invention

The invention relates to bicycle brakes and more particularly to a quick-release device of a bicycle brake cable.

2. Description of Related Art

A conventional quick-release device of a bicycle brake cable is provided with a brake arm configured to mount on a frame of the bicycle; a guider selectively slidably mounted on a free end of the brake arm; and a safe lever pivotally mounted in the brake arm. The brake arm comprises a groove defined along an axis thereof. The guider is hollow to allow the brake cable to extend through. The safe lever comprises a pivot point that divides the safe lever into a press portion and a stop portion extending toward the guider to prevent the guider from an accidental operation due to an improper force. The guider comprises a sliding head and an insertion extending into and urging against the groove to prevent the guider from rotating relative to the brake arm and the brake cable from being loosened.

However, its applications are limited. Thus, the need for improvement still exists.

SUMMARY OF THE INVENTION

It is therefore one object of the invention to provide a quick-release device for a bicycle brake including a first brake arm, a second brake arm, and a brake cable terminated at the second brake arm, the quick-release device comprising a lever including a long part and a short part pivotably secured to a top of the second brake arm; and an attachment assembly for securing the brake cable to a joining portion of the long part and the short part; wherein a rotation of the lever in a first direction loosens the brake cable and increases a distance between the first brake arm and the second brake arm; and wherein a rotation of the lever in a second direction contrary to the first direction tightens the brake cable and decreases the distance between the first brake arm and the second brake arm.

The above and other objects, features and advantages of the invention will become apparent from the following detailed description taken with the accompanying drawings.

DETAILED DESCRIPTION OF THE INVENTION

Figure 1:
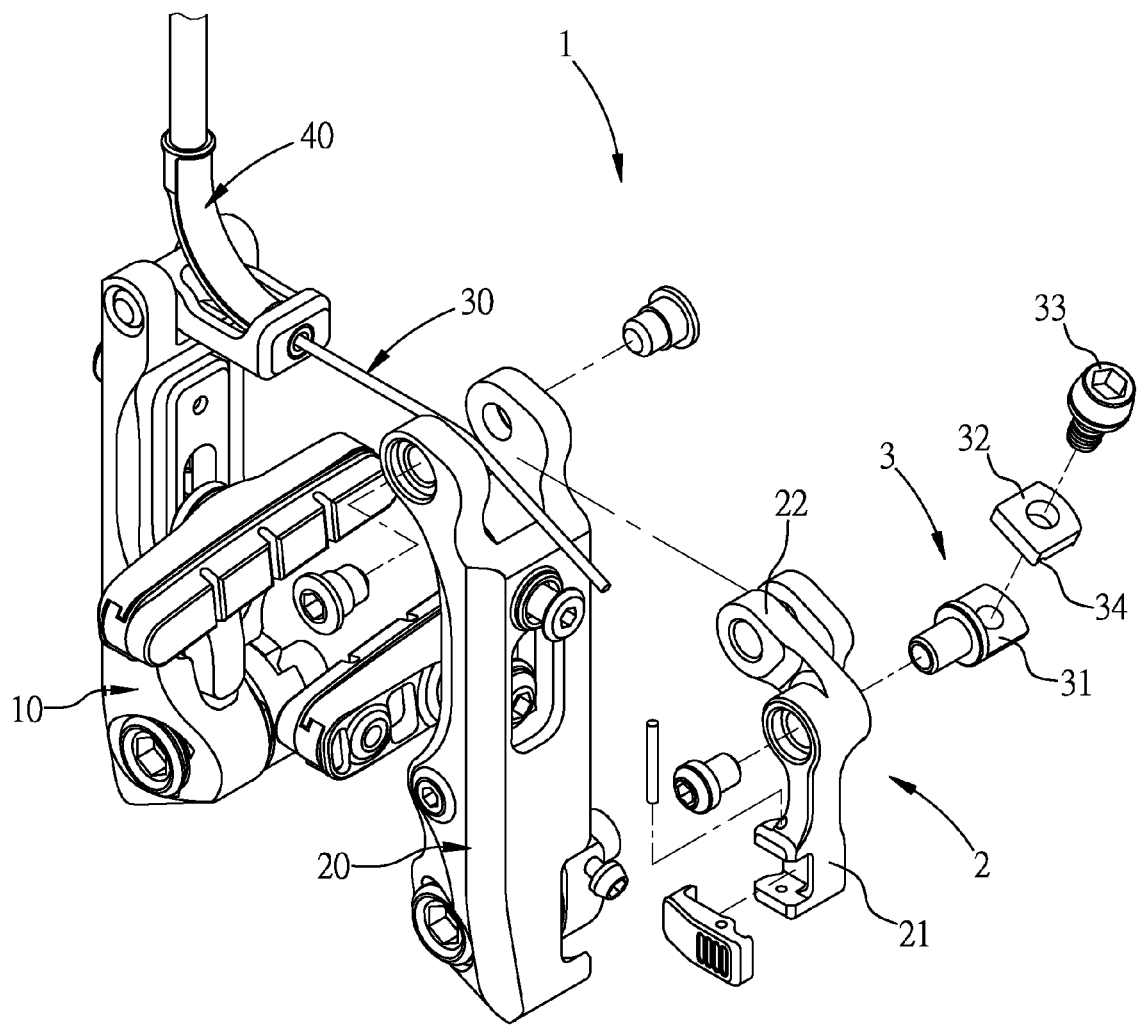
FIG. 1 is an exploded perspective view of a brake mechanism of a bicycle brake incorporating a quick-release device of a brake cable according to a first preferred embodiment of the invention.
Figure 2:
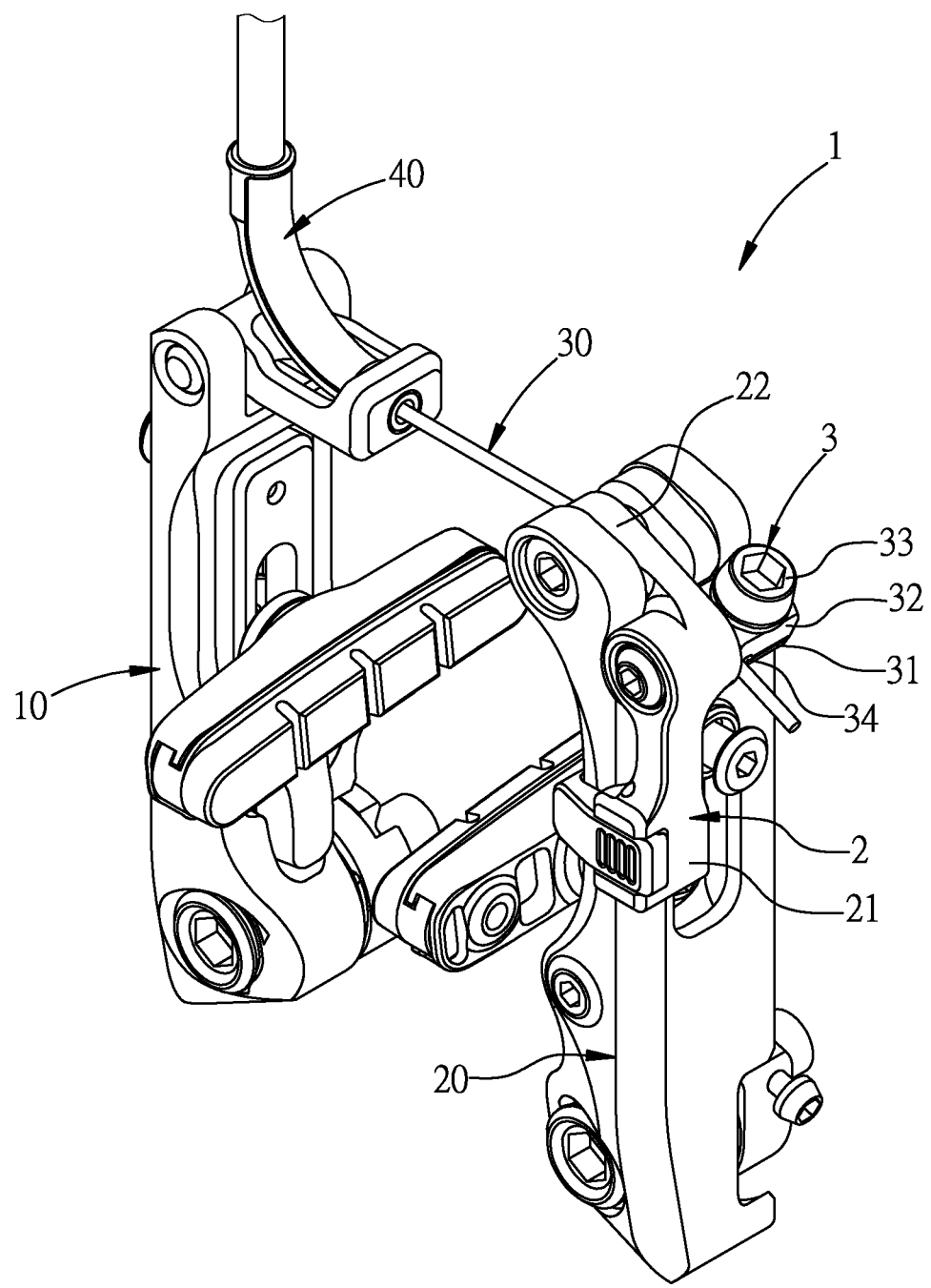
FIG. 2 is a perspective view of the assembled brake mechanism.

Referring to FIGS. 1 to 4, a linear-pull brake of a bicycle incorporating a quick-release device 1 of a brake cable according to a first preferred embodiment of the invention comprises the following components as discussed in detail below.

Two brake arms 10 and 20 are provided. A brake cable 30 passes through a bent, rigid tube 40 at a pivotal top of one brake arm 10 to terminate at the other brake arm 20. The quick-release device 1 is mounted on the other brake arm 20 and includes a lever 2 and an attachment assembly 3. The lever 2 includes a long part 21 releasably secured to the other brake arm 20, and a short part 22 pivotably secured to a top of the other brake arm 20.

The attachment assembly 3 includes an attaching member 31 secured to a joining portion of the long part 21 and the short part 22, a washer 32 having a groove 34 facing the attaching member 31 for allowing the brake cable 30 to pass through, and a fastener 33 for securing the washer 32 to the attaching member 31 and causing the attaching member 31 and the washer 32 to fasten the brake cable 30 in the groove 34.

Figure 4:
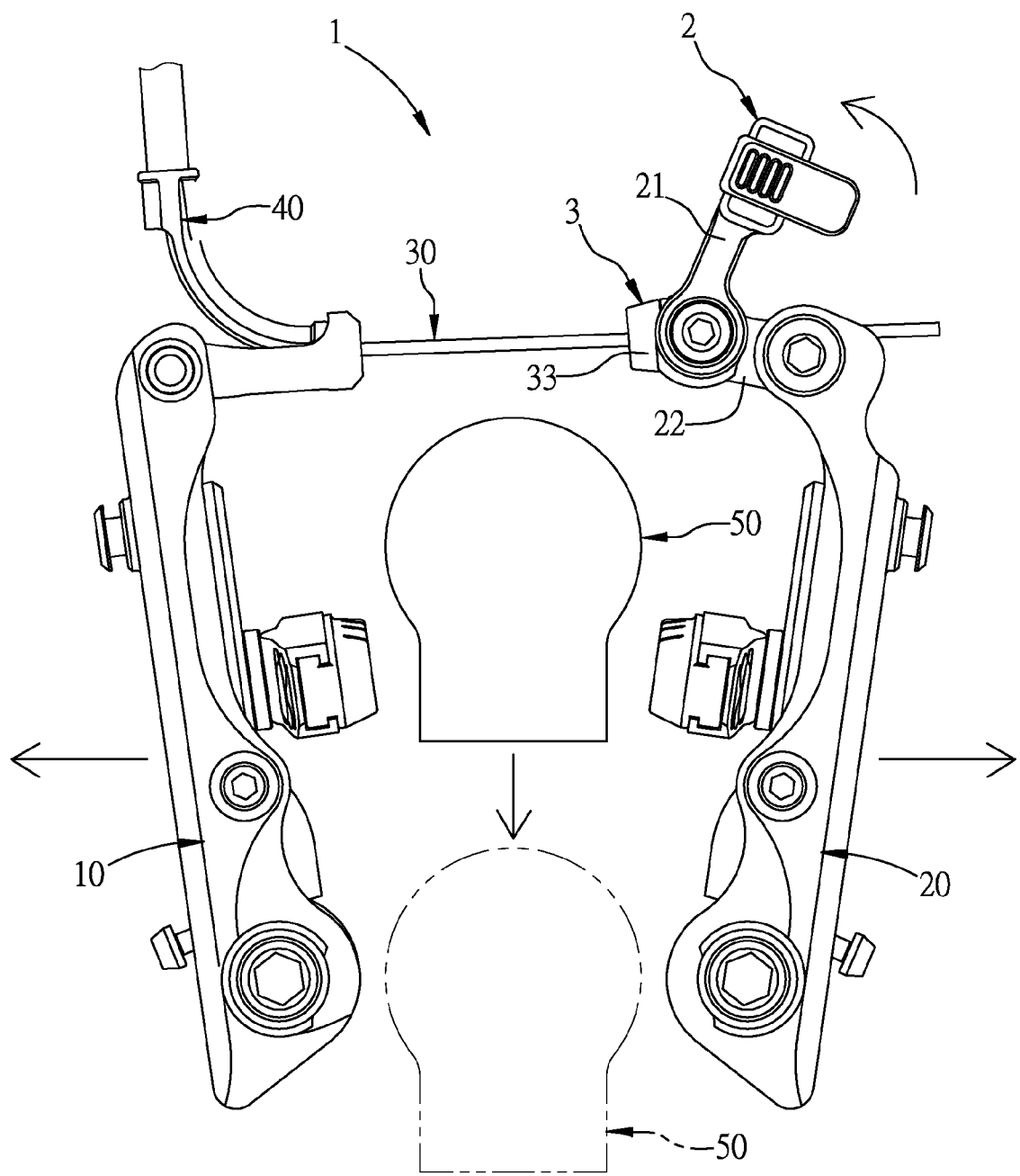
FIG. 4 is a view similar to FIG. 3 showing the brake cable loosened and the brake mechanism unfastened.
Figure 5:
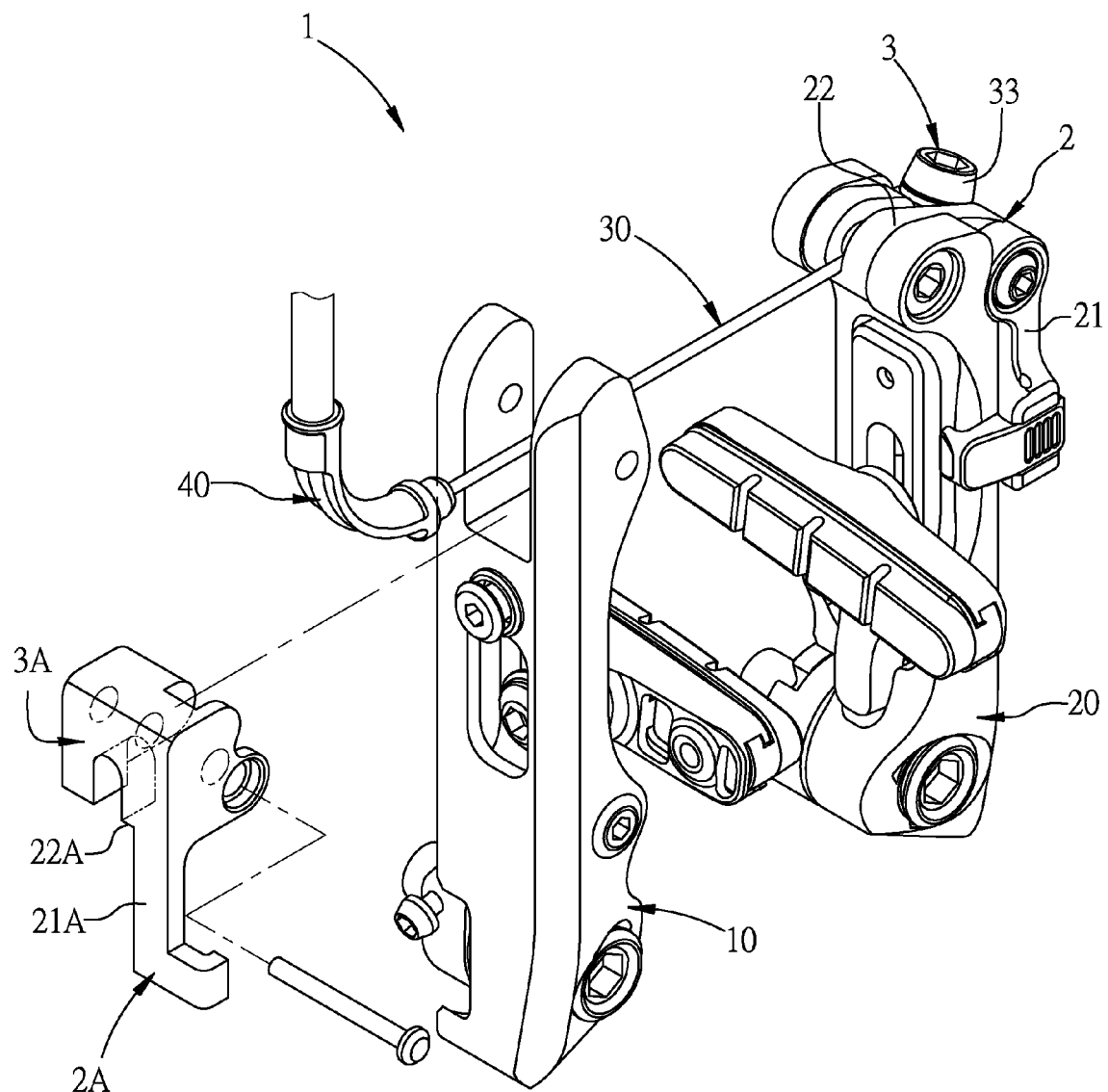
FIG. 5 is an exploded perspective view of a brake mechanism of a bicycle brake incorporating a quick-release device of a brake cable according to a second preferred embodiment of the invention.
Figure 6:
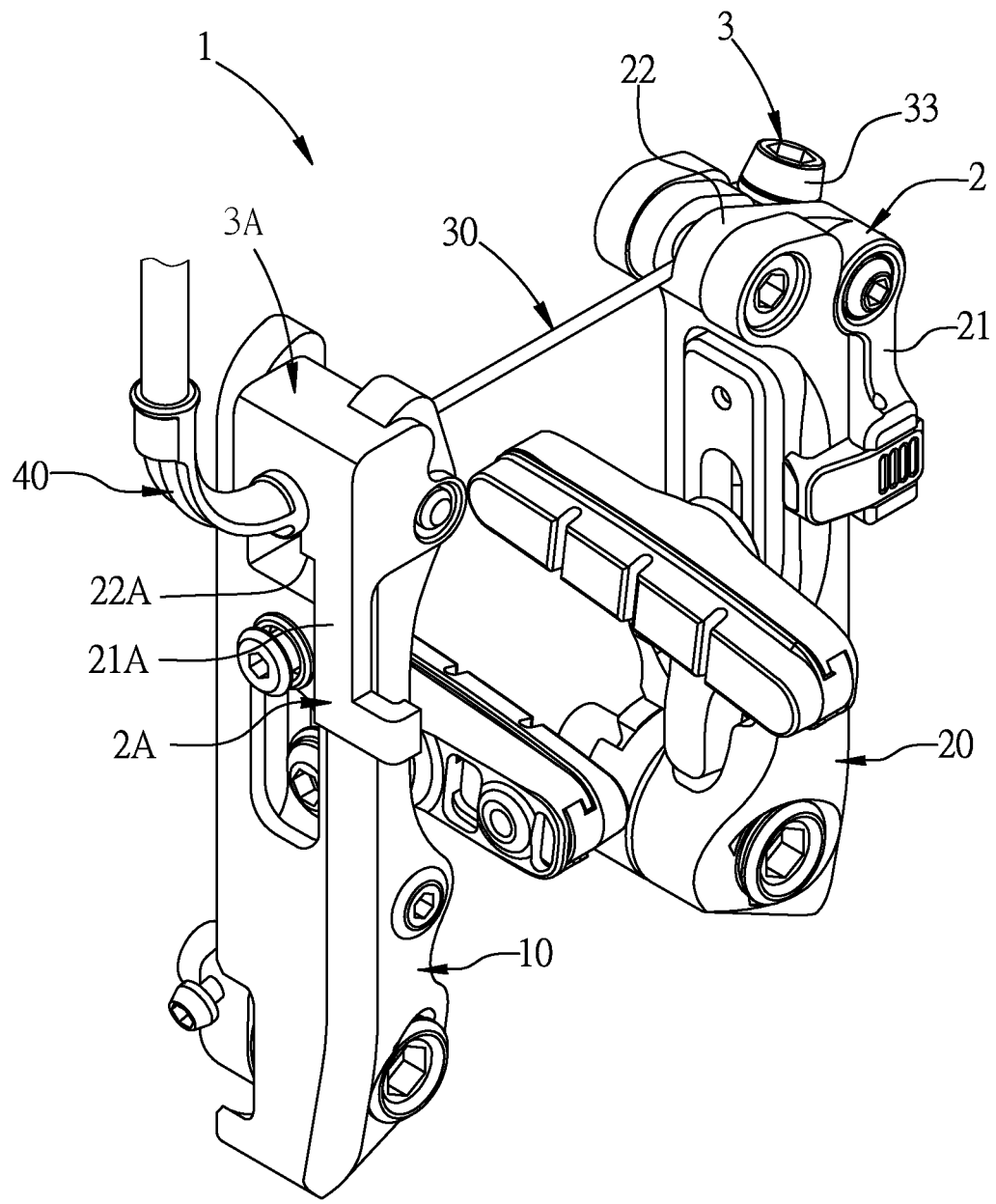
FIG. 6 is a perspective view of the assembled brake mechanism of FIG. 5.

A bicycle rider may counterclockwise pivot the lever 2 about the pivot joining the short part 22 and the other brake arm 20 (see FIG. 4). Thus, the brake cable 30 is loosened and a distance between one brake arm 10 and the other brake arm 20 is increased. At this position, the rider can replace a malfunctioned wheel 50.

Figure 3:
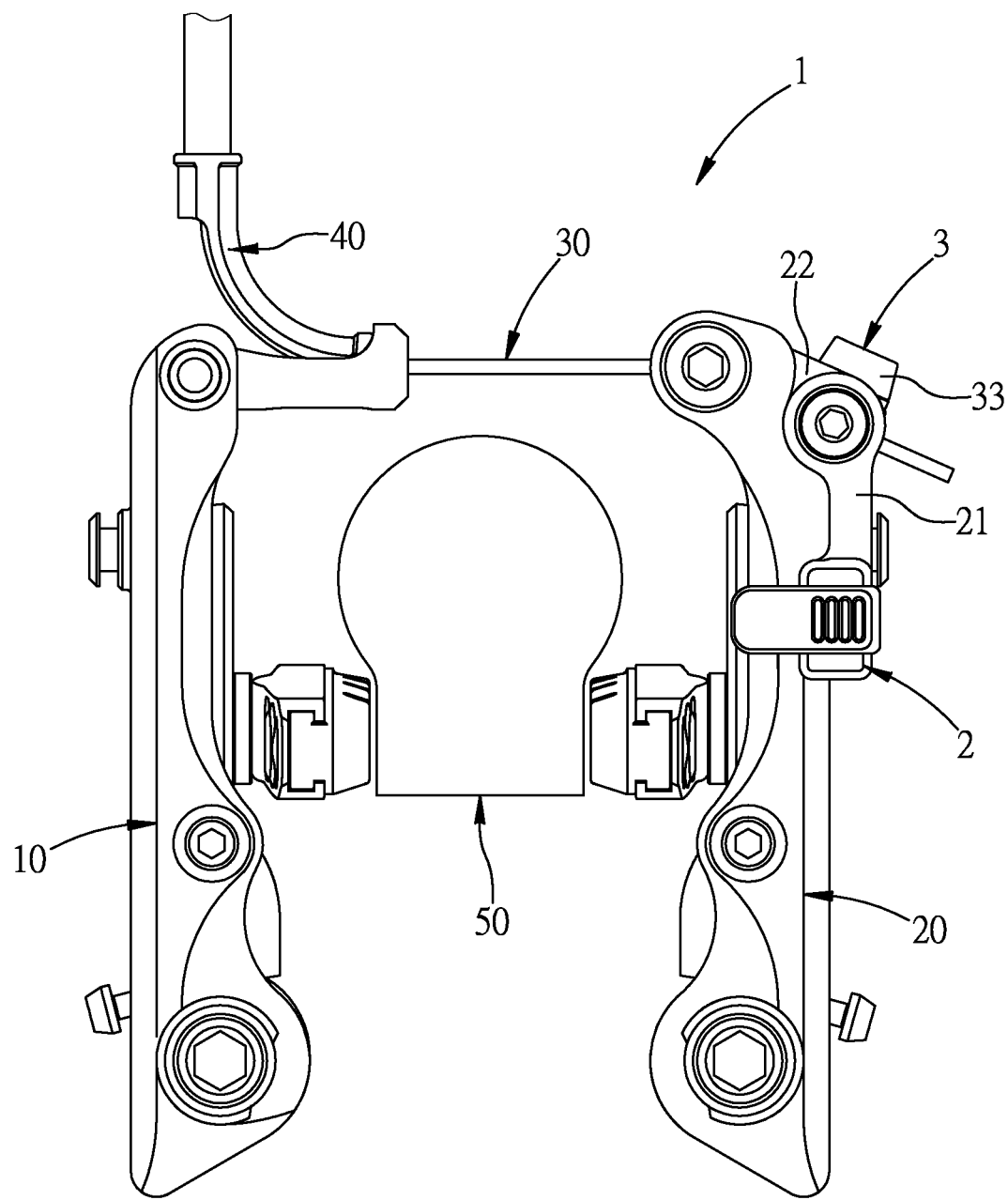
FIG. 3 is a front view of the brake mechanism of FIG. 2 with a wheel rim disposed between the brake pads.

After replacing the wheel 50 with a new one, the rider may clockwise pivot the lever 2 about the pivot from the position of FIG. 4 to the position of FIG. 3. Thus, the brake cable 30 is tightened and the distance between one brake arm 10 and the other brake arm 20 is decreased (see FIG. 3). At this position, the wheel 50 is installed and the bicycle is ready to ride.

Referring to FIGS. 5 to 9, a linear-pull brake of a bicycle incorporating a quick-release device 1 of a brake cable in accordance with a second preferred embodiment of the invention is shown.

Two brake arms 10 and 20 are provided. A brake cable 30 passes through a bent, rigid tube 40 at a pivotal top of one brake arm 10 to terminate at the other brake arm 20. The quick-release device 1 is mounted on both of the brake arms 10 and 20. Components of the quick-release device 1 mounted on the other brake arm 20 include a lever 2 and an attachment assembly 3. The lever 2 includes a long part 21 releasably secured to the other brake arm 20, and a short part 22 pivotably secured to a top of the other brake arm 20.

The attachment assembly 3 includes an attaching member (not shown) secured to a joining portion of the long part 21 and the short part 22, a washer (not shown) having a groove (not shown) facing the attaching member for allowing the brake cable 30 to pass through, and a fastener 33 for securing the washer to the attaching member and causing the attaching member and the washer to fasten the brake cable 30 in the groove.

Components of the quick-release device 1 mounted on one brake arm 10 include a lever 2A and an attachment assembly 3A integrally formed with the lever 2A. The lever 2A includes a long part 21A and a short part 22A pivotably secured to a top of one brake arm 10. The bent, rigid tube 40 has one end positioned by the attachment assembly 3A.

Figure 8:
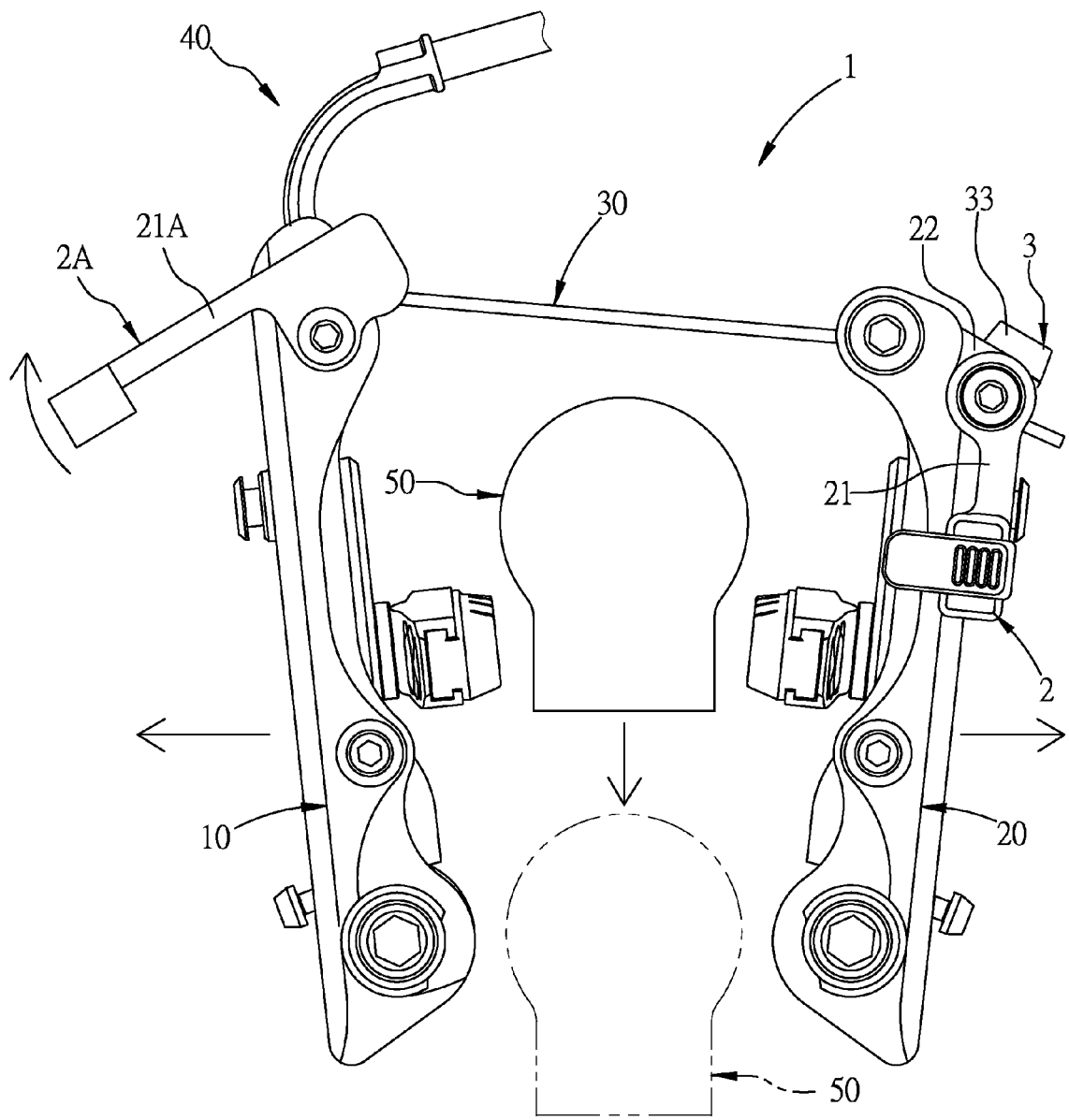
FIG. 8 is a view similar to FIG. 3 showing one brake cable loosened and the brake mechanism unfastened.
Figure 9:
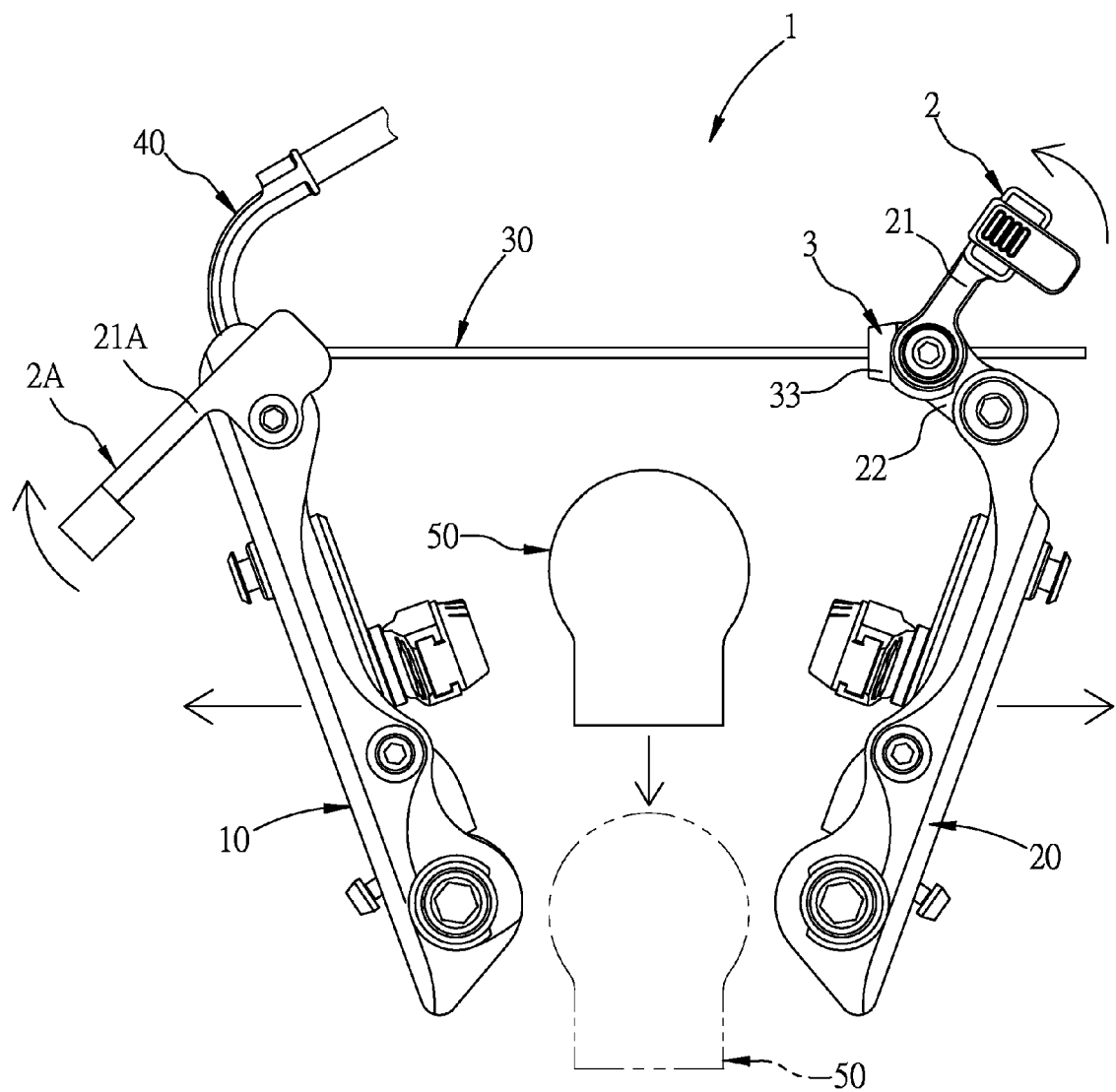
FIG. 9 is a view similar to FIG. 8 showing two brake cables loosened and the brake mechanism unfastened.

A bicycle rider may clockwise pivot the lever 2A about the pivot joining the short part 22 and one brake arm 10 (see FIG. 8). Thus, the brake cable 30 is loosened and a distance between one brake arm 10 and the other brake arm 20 is increased. At this position, the rider can replace a malfunctioned wheel 50.

Figure 7:
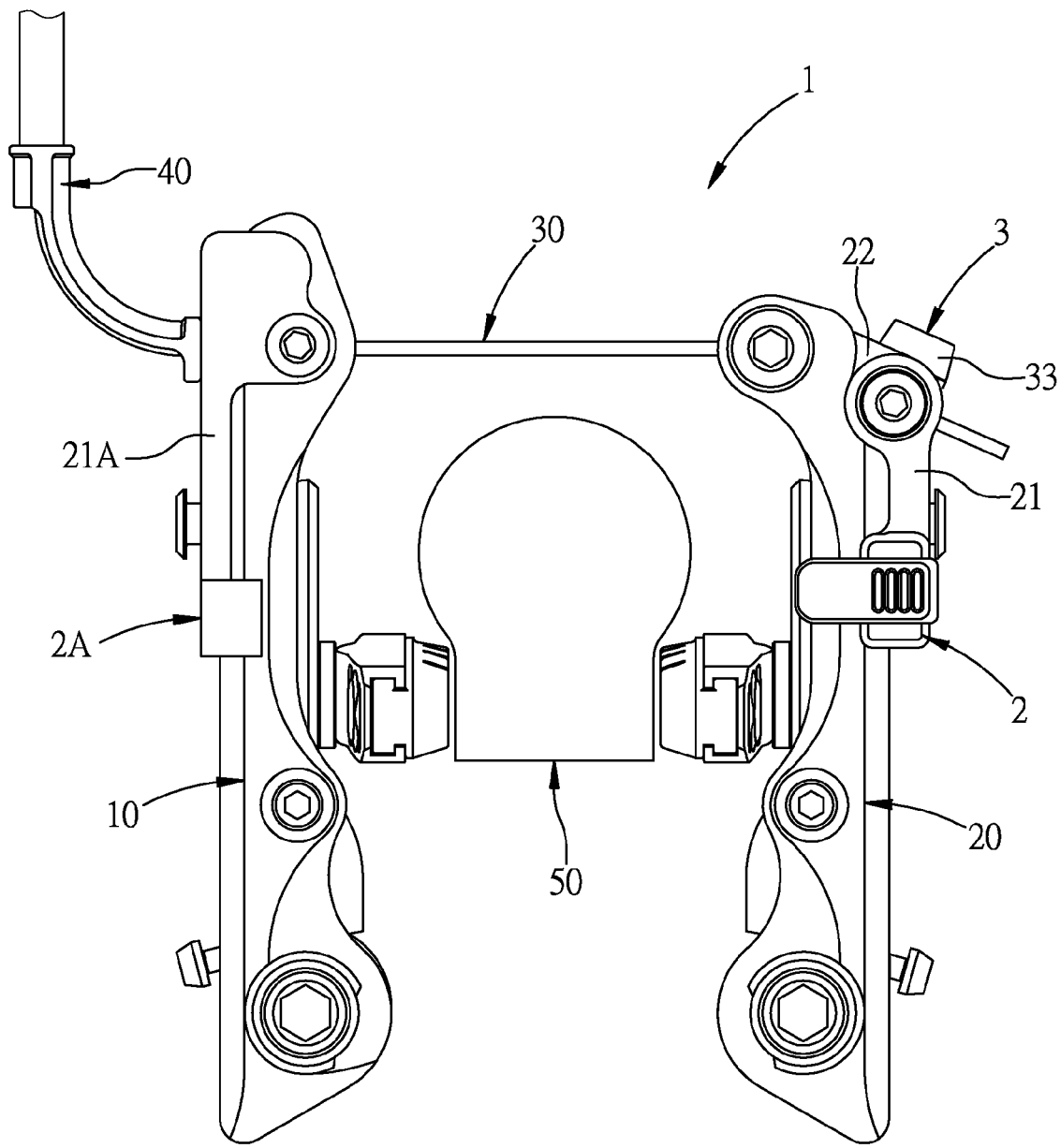
FIG. 7 is a front view of the brake mechanism of FIG. 6 with a wheel rim disposed between the brake pads.

After replacing the wheel 50 with a new one, the rider may counterclockwise pivot the lever 2A about the pivot from the position of FIG. 8 to the position of FIG. 7. Thus, the brake cable 30 is tightened and the distance between one brake arm 10 and the other brake arm 20 is decreased (see FIG. 7). At this position, the wheel 50 is installed and the bicycle is ready to ride.

In addition, the rider may operate components of the quick-release device 1 mounted on the other brake arm 20 in a manner discussed in the first preferred embodiment (see FIGS. 1 to 4 and 9). This operation can further increase the distance between one brake arm 10 and the other brake arm 20 for ease of wheel replacement.

Figure 10:
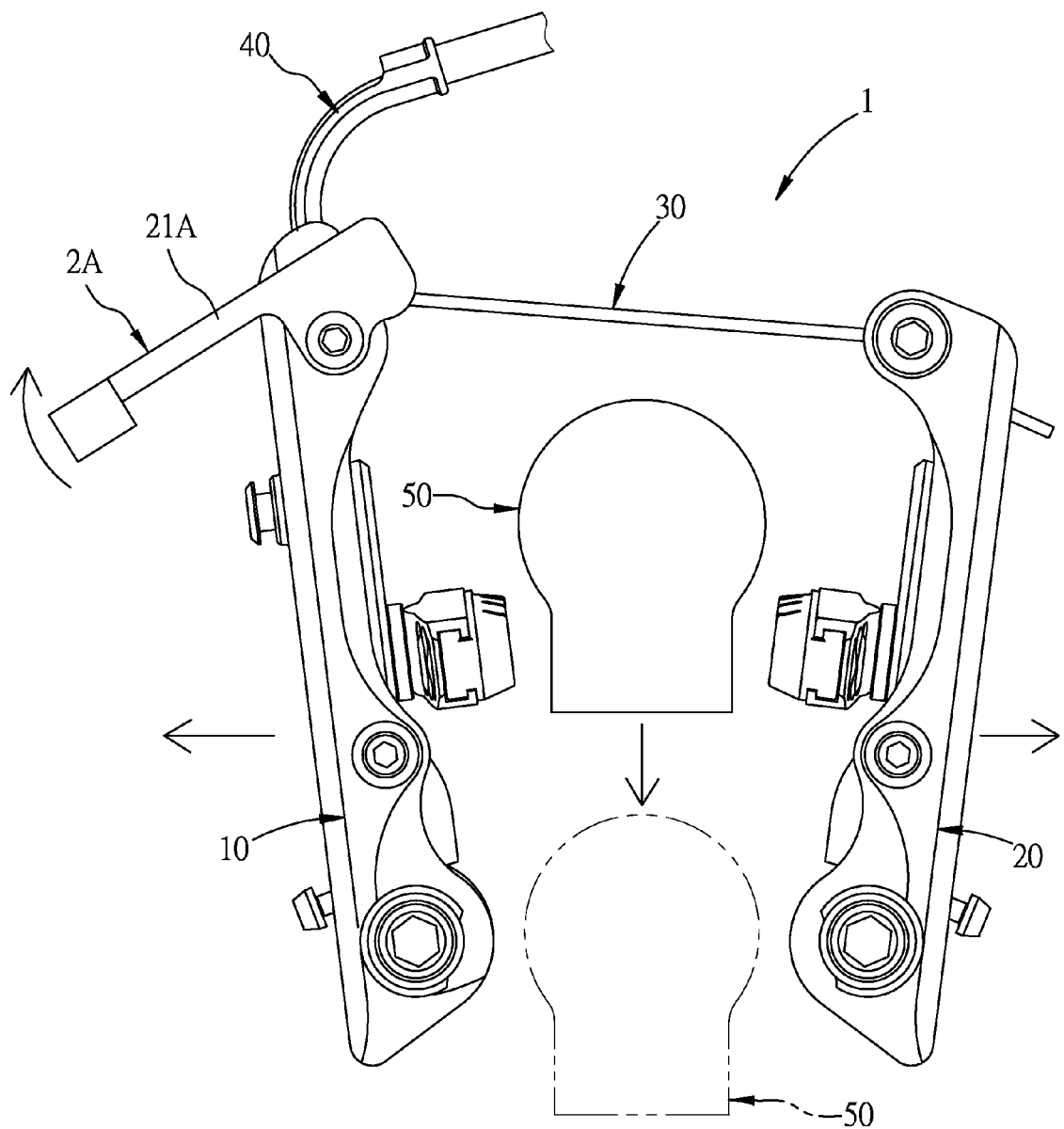
FIG. 10 is a front view of a brake mechanism of a bicycle brake incorporating a quick-release device of a brake cable according to a third preferred embodiment of the invention, the brake cable loosened and the brake mechanism unfastened.

Referring to FIG. 10, a linear-pull brake of a bicycle incorporating a quick-release device 1 of a brake cable in accordance with a third preferred embodiment of the invention is shown. The characteristics of the third preferred embodiment are substantially the same as that of the second preferred embodiment except the following: Components of the quick-release device 1 mounted on the other brake arm 20 are eliminated.

While the invention has been described in terms of preferred embodiments, those skilled in the art will recognize that the invention can be practiced with modifications within the spirit and scope of the appended claims.

What is claimed is:

1. A quick-release device for a bicycle brake including a first brake arm, a second brake arm, and a brake cable, the quick-release device comprising:

a lever including a first part and a second part pivotably secured to a top of the second brake arm; wherein the brake cable is terminated at the lever; wherein a rotation of the lever in a first direction loosens the brake cable and increases a distance between the first brake arm and the second brake arm; and wherein a rotation of the lever in a second direction contrary to the first direction tightens the brake cable and decreases the distance between the first brake arm and the second brake arm;

an attachment assembly for securing the brake cable to a joining portion of the first part and the second part;

a bent, rigid tube pivotably secured to a top of the first brake arm with the brake cable passing through the bent, rigid tube;

a second lever including a first part and a second part pivotably secured to a top of the first brake arm; and a second attachment assembly integrally formed with the second lever; wherein the bent, rigid tube has one end positioned by the second attachment assembly; wherein a rotation of the second lever in the second direction loosens the brake cable and increases the distance between the first brake arm and the second brake arm; and wherein a rotation of the second lever in the first direction tightens the brake cable and decreases the distance between the first brake arm and the second brake arm.

* * * * *